United States Patent [19]
Babu et al.

[11] Patent Number: 5,112,882
[45] Date of Patent: May 12, 1992

[54] RADIATION CURABLE POLYOLEFIN PRESSURE SENSITIVE ADHESIVE

[75] Inventors: Gaddam N. Babu, Woodbury, Minn.; Susan S. Christopher, Spring Valley, Wis.; Bruce C. Copley, Shoreview, Minn.; Thomas S. Overstreet, Austin, Tex.

[73] Assignee: Minnesota Mining and Manufacturing Company, St. Paul, Minn.

[21] Appl. No.: 403,662

[22] Filed: Sep. 6, 1989

[51] Int. Cl.$^5$ ............................................... C08J 3/28
[52] U.S. Cl. .................................... 522/158; 522/33; 522/112
[58] Field of Search .................... 522/158, 112, 33

[56] References Cited

U.S. PATENT DOCUMENTS

| | | | |
|---|---|---|---|
| 2,933,480 | 4/1960 | Gresham et al. | 260/80.5 |
| 3,542,717 | 11/1970 | Lipman | 260/27 |
| 3,635,755 | 1/1972 | Balinth et al. | 117/122 |
| 3,954,697 | 4/1976 | McConnell et al. | 526/350 |
| 4,127,461 | 11/1978 | Paulen | 522/111 |
| 4,178,272 | 12/1979 | Meyer, Jr. et al. | 260/27 |
| 4,284,541 | 8/1981 | Takeda et al. | 525/73 |
| 4,288,358 | 9/1981 | Trotter et al. | 260/31.8 |
| 4,303,485 | 12/1981 | Levens | 522/183 |
| 4,340,705 | 7/1982 | Lal et al. | 526/139 |
| 4,551,503 | 11/1985 | Lal et al. | 525/332.1 |
| 4,939,209 | 7/1990 | Kitagawa et al. | 522/120 |

OTHER PUBLICATIONS

Odian, G., "Principles of Polymerization", Ch. 8.4 (2nd Ed., J. Wiley & Sons, N.Y., 1981).
Boor, J., "Ziegler-Natta Catalysts & Polymerizations", Ch. 19, Academic Press, N.Y., 1979.

*Primary Examiner*—Marion E. McCamish
*Assistant Examiner*—Mark A. Chapman
*Attorney, Agent, or Firm*—Gary L. Griswold; Walter N. Kirn; Lorraine R. Sherman

[57] ABSTRACT

Pressure sensitive adhesive compositions comprise one or more poly(alpha-olefin) homopolymers, copolymers, terpolymers, and tetrapolymers derived from monomers containing 6 to 10 carbon atoms and photoactive crosslinking agents. Radiation curing provides adhesive films having a superior balance of peel and shear adhesive properties. The pressure sensitive adhesive is useful in pressure sensitive adhesive tapes, in articles containing transfer adhesive films, and as the bonding material between supports in a laminated structure.

25 Claims, No Drawings

RADIATION CURABLE POLYOLEFIN PRESSURE SENSITIVE ADHESIVE

FIELD OF THE INVENTION

The invention relates to radiation curable poly($\alpha$-olefin) pressure-sensitive adhesive compositions having superior cohesive strength and shear adhesion and to laminated structures made therefrom which are useful as high temperature tapes and transfer adhesives.

BACKGROUND OF THE INVENTION

A continuing need in the pressure-sensitive adhesive (PSA) art is achievement of better control over various mechanical and process properties so that adhesives can be "tailor-made" for specific, highly demanding end-use applications such as packaging, medical, and masking tapes. These applications require a proper balance of properties, and this balance changes with the particular end-use.

Among the earliest polymers to provide a reasonable balance of the properties required for satisfactory PSA performance were the natural and synthetic rubbers. However, these PSAs had poor aging properties, and the art quickly recognized the need to eliminate ethylenically unsaturated groups from the polymer backbone of rubber adhesives in order to improve their oxidative stability.

This became possible with the discovery of Ziegler-Natta (ZN) coordination catalyst systems. With the discovery of ZN catalysts, it became possible to polymerize $\alpha$-olefin monomers to high molecular weight. The homopolymers of the $C_6$–$C_{10}$ $\alpha$-olefins were naturally tacky and therefore good candidates for PSAs since they also had low toxicity, good aging and favorable environmental stability (i.e., low oxidation). These homopolymers were chemically inert, resistant to plasticizer migration, and relatively inexpensive. However they had poor cohesive strength and therefore lacked the shear adhesion necessary for high performance PSAs.

Use of ZN catalysts to make homopolymers from $\alpha$-olefin monomers, and copolymers from mixtures of $\alpha$-olefin and non-conjugated polyene monomers is old in the art and is not the subject of this invention. ZN polymerizations are succinctly summarized in Odian, G., "Principles of Polymerization", Ch. 8.4 (Second Edition, J. Wiley & Sons, New York, 1981). For a more detailed discussion of the polymerization of $\alpha$-olefins, see Boor, J., "Ziegler-Natta Catalysts and Polymerizations", Ch. 19 (Academic Press, NY, 1979).

Radiation curing has been frequently used to chemically crosslink the polymeric component of adhesives in attempts to increase the cohesive strength of coated adhesive films. The results have been unsatisfactory because competing crosslinking and degradation (chain scission) reactions occur simultaneously. Therefore in some PSA systems, especially those formulated from polymers containing propylene, radiation curing leads to a loss of cohesive strength and shear adhesion.

Adhesives derived primarily from $C_6$ or larger $\alpha$-olefins are well known in the art. U.S. Pat. No. 3,542,717 describes poly($\alpha$-olefin) adhesive compositions comprising mixtures of polyolefin copolymers derived from olefin monomers with different molecular weights. (i.e. $\alpha$-olefins having 11–20 carbon atoms, and different $\alpha$-olefins having 4–20 carbon atoms.) The resulting adhesive has high shear and peel adhesion at room temperature, but at high temperatures cohesive strength and shear adhesion are unacceptably low for most applications.

U.S. Pat. No. 3,635,755 describes PSA polyolefin compounds suitable for use as single component PSAs for surgical tapes that are substantially non-allergenic. Such adhesives can be made from homopolymers of the $C_6$ to $C_{11}$ $\alpha$-olefins or from interpolymers of $C_2$ to $C_{16}$ $\alpha$-olefins having an intrinsic viscosity of 1.5 to 7.0, a Williams, plasticity of 0.8 to 4.0, and an acetone/heptane soluble fraction of less than 25% by weight.

Tapes made from these adhesives have low shear adhesions that facilitate non-irritating removal from the skin. However, this low shear adhesion is unsuitable, for example, for masking or packaging tape applications.

U.S. Pat. No. Nos. 3,954,697 and 4,178,272 describe hot-melt adhesives derived from copolymers of propylene and $C_6$–$C_{10}$ $\alpha$-olefins. The '697 patent teaches that while $C_6$–$C_8$ $\alpha$-olefins copolymers are permanently tacky, they have poor cohesive strength and consequently lack shear adhesion. Therefore the higher $\alpha$-olefins must be copolymerized with propylene in order to meet "the critical property requirements for a pressure-sensitive adhesive material" (col. 1, line 37). The copolymer must contain more than 40 mole % propylene, especially if static shear is to exceed 1000 minutes. The '272 patent describes compositions of ZN catalyst system and process conditions useful in preparing the "tacky" copolymers required for PSAs. Also disclosed are stereo-regulating three-component ZN catalyst systems that produce high molecular weight, crystalline block copolymers unsuitable for PSA applications (col. 2, lines 39–65), but are stated to be useful sealing gags, cartons, and as an adhesive for floor tiles.

This approach is further advanced in U.S. Pat. No. 4,288,358 which describes hot-melt adhesive compositions containing terpolymers of propylene, 1-butene/1-pentene, and C<-C $\alpha$-olefins; tackifying resins; and plasticizing oils, in yet further efforts to simultaneously optimize the adhesive and process properties of these compositions.

While these references teach optimized processing conditions for preparation of hot melt adhesives that are readily coatable or extrudable at the melt temperature, these materials have poor PSA properties. In particular, they have poor adhesion under shear. To be useful, high temperature masking tapes used in the automotive industry must have good "shear adhesion". Attempts to improve these propylene containing poly($\alpha$-olefin) adhesives of the references by radiation crosslinking have led to a degradation of PSA properties, such as shear adhesion.

U.S. Pat. No. No. 2,933,480 describes two-component coordination catalyst systems (ZN) capable of copolymerizing mixtures of $\alpha$-olefins and non-conjugated diolefins to yield sulfur-vulcanizable elastomers described as "rubber-like" with iodine numbers of 3 to 50, and intrinsic viscosities of 0.5 to 5.0.

U.S. Pat. Nos. 4,340,705 and 4,551,503 describe 3-component ZN catalyst systems for the copolymerization of mixtures of $\alpha$-olefins and non-conjugated $\alpha,\omega$-diolefins to yield sulfur vulcanizates having high molecular weight, high inherent viscosity (5 or greater), low gel (0–5 %), and improved (higher) unsaturation which provide improved vulcanizate properties.

No utility as adhesives is taught or claimed for the vulcanizates described in any of the three patents referenced above.

SUMMARY OF THE INVENTION

Briefly, the present invention provides a radiation curable poly(α-olefin)-containing adhesive composition that is pressure-sensitive at room temperatures and which upon cure yields an adhesive film having a superior balance of peel and shear adhesion and comprising:
(a) at least one polymer comprised of: 85 to 100 mole percent, preferably 85 to 99 mole percent, of one or more $C_6$ to $C_{10}$ α-olefin monomers, and 15 to 0 mole percent, preferably 15 to 1.0 mole percent, of one or more polyene monomers, with the proviso that the mole percentages of all monomers sum to 100: and
(b) sufficient photoactive crosslinking agent to crosslink the composition upon irradiation from a source of actinic radiation.

Preferably the polymer of the present invention has a glass transition temperature (Tg) in the range of $-70°$ C to $0°$ C., more preferably in the range of $-60$ to $-20°$ C., an inherent viscosity in the range of 0.4 to 9.0 dl/g, more preferably 0.5 to 6.0 dl/g, and most preferably 1.5 to 4.0 dl/g. Number average molecular weights of the polymers are in the range of 5,000 to 50,000,000, preferably 50,000 to 5,000,000.

Polymers formed from polyene monomers contain residual ethylenically unsaturated groups in the polymer backbone and/or, preferably, in pendant side chains that can be used in radiation initiated crosslinking reactions to improve the cohesive strength of the adhesive.

Compositions with improved PSA properties may be made by blending two or more polymers of the invention or by blending polymers and tackifying resins. Such compositions are obtained by blending 100 parts by weight of the polymer with from more than zero and preferably in the range of 1 to 150 parts by weight of a tackifying resin.

Poly(α-olefins) have excellent adhesion, thermal-oxidative stability, and chemical/electrical resistance, and they are physiologically inert. These properties make them excellent pressure-sensitive adhesives for a wide range of applications where it is desirable to have independent control of peel and shear adhesion.

It is believed that the background art does not teach PSA compositions comprising one or more poly(α-olefin) homopolymers, copolymers, terpolymers, or tetrapolymers derived from monomers containing 6 to 10 carbon atoms and further comprising one or more photoactive crosslinking agents, the compositions having been radiation-cured to yield adhesive films possessing substantial high temperature shear strength.

The present invention provides a poly(α-olefin)-containing adhesive composition that is radiation-curable. The poly(α-olefin) adhesive composition can be cured to yield a PSA adhesive film with an improved balance of peel and shear adhesion. The peel and shear adhesion values are capable of being varied independently to achieve desired values. Adhesive films of the invention preferably have peel values in the range of 2 to 120 N/dm and shear values in the range of 1 to 10,000 or more minutes. Radiation curing can be achieved by ultraviolet or electron beam radiation.

The adhesive of the invention can be applied to appropriate substrate surfaces by a wide range of processes, i.e., solution coating, solution spraying, hot-melt extrusion, emulsion coating, etc., to make adhesive tapes, adhesive transfer films, and the like.

As used in this invention:
"polymer" means a homopolymer, a copolymer, a terpolymer, or a tetrapolymer; polymers derived from more than one monomer may be either random or block polymers; "polyene monomer" means a $C_4$-$C_{24}$ hydrocarbon containing two or more conjugated or non-conjugated ethylenically unsaturated groups which may also contain 1 to 5 unitary heteroatoms selected from the group consisting of oxygen and silicon;
"photoactive crosslinking agent" means a compound which, under the influence of radiation, connects polymer chains and becomes incorporated therein; this increases the molecular weight of the adhesive and thus its cohesive strength without unduly affecting its compliance or other PSA properties.

DESCRIPTION OF PREFERRED EMBODIMENTS

The radiation-curable α-olefin polymers of the invention preferably have the general formula:

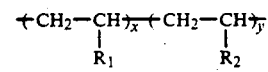

where $R_1$ can be selected from monovalent hydrocarbon groups containing 4 - 8 carbon atoms. Representative examples include, but are not limited to: n-butyl, n-pentyl, n-hexyl, n-heptyl, n-octyl; and branched hydrocarbon radicals such as 2-methyl-butyl, 2-ethyl-butyl, 3-methyl-hexyl, 2-ethyl-hexyl, 5-methyl-hexyl, 5-ethyl-hexyl, etc.

$R_2$ can be a monovalent hydrocarbon group containing one or more ethylenically unsaturated groups selected from the group consisting of:

n=0-14;
$R_3$ can be a $C_2$ to $C_{10}$ monovalent hydrocarbon group containing one or more ethylenically unsaturated groups; Ar can be a divalent aromatic radical containing 1 or 2 fused or catenated aromatic rings with from 0-8 substituents selected from the group consisting of alkyl, aryl, cycloalkyl, alkoxy, and aryloxy containing from 1-12 carbon atoms;
Q can be a divalent group selected from the group consisting of

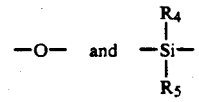

where $R_4$ and $R_5$ are the same or different $C_1$ to $C_{10}$ monovalent organic groups selected from the group consisting of alkyl, cycloalkyl, alkaryl, aryl, alkoxy, aryloxy;
x is the mole percent of one or more $C_6$-$C_{10}$ α-olefin monomer(s), the total ranging from 85-100 mole percent; preferably y is the mole percent of one or more polyene monomer(s), the total ranging from 15–0 mole percent; with the proviso that x+y TM 100 mole percent.

The preferred ratio of x:y is about 85:15, and more preferably 90:10 when the pendant unsaturation is an internal olefin, and most preferably 95:5 when the pendant unsaturation is a terminal olefin as in the case of the linear alpha,omega-dienes.

Suitable polyene monomers useful in the practice of the present invention are comprised of hydrocarbons containing two to four ethylenically unsaturated groups. Examples of suitable polyenes, many of which are commercially available, include, but are not limited to: the $C_6-C_{14}$ alpha,omega dienes such as 1,5-hexadiene, 1,6-heptadiene and 1,9-decadiene; conjugated dienes such as 2-phenyl-1,3-butadiene, 2,3-diphenyl-1,3-butadiene, 2-ethyl-1,3-butadiene, 2-isopropyl-1,3-butadiene, 2-n-amyl-1,3-butadiene, 2,3-dibutyl-1,3-butadiene, isoprene, 1,3-pentadiene, and cyclooctadiene; trienes such as 1,4,7-octatriene, 1,4,9-decatriene, 1,5,9-decatriene, 1,6,9-decatriene, 1,9,12-octadecatriene, 1,9,17-octadecatriene, 2,6-dimethyl-2,4,6-octatriene (alloocimene), and cyclododecatriene; terpenes such as myrcene and farnesene; mono/multi-cylic dienes, such as 4-vinyl-1-cyclohexene, 5-ethylidene-2-norbornene, dicyclopentadiene, limonene, beta-pinene, methylene-norbornene and various alkenyl-norbornenes with the structure:

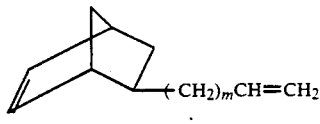

where m is an integer from 1 to 18.

2-ethyl-1,3-butadiene and 2-isopropyl-1,3-butadiene can be prepared according to the method of Marvel et al., JACS, 70, 1948, p. 1694. 2-n-amyl-1,3-butadiene can be prepared according to the method of Marvel & Williams, JACS, 70, 1948, p. 3842. The general synthetic route to make various 2-alkyl 1,2-butadienes has been described in Encyc.lopedia of Polymer Science & Technology Vol. 2, pp. 515–518 (1988). 1,9,17-octadecatriene can be prepared according to the method of Marvel & Rodgers, J. of Polymer Sci., XLIX, 961, p. 335.

The poly($\alpha$-olefin) polymers of the present invention can be either random co, ter, or tetra polymers; or blocks of homopoly($\alpha$-olefins) interspersed with polyene units depending upon the relative reactivities of the various monomers. Since the reactivity at each end of the alpha,omega dienes are about equal, gel-permeation chromatographic analysis (with low-angle light scattering detector) of polymers containing these monomers show more branching than observed with monomers having double bonds of unequal reactivity. When diene monomers in which the reactivities of the double bonds are unequal are polymerized, as is the case with 7-octenyl-dimethylvinylsilane, essentially linear polymers are formed during ZN polymerization.

The polyene monomers are selected from the group consisting of aliphatic dienes, aliphatic trienes, aliphatic tetraenes, aromatic dienes, aromatic trienes, aromatic tetraenes, monocyclic dienes, bicyclic dienes, tricyclic dienes, tetracyclic dienes, monocyclic trienes, bicyclic trienes, tricyclic trienes, and tetracyclic trienes.

The $\alpha$-olefin and polyene monomers can be polymerized in the presence of Ziegler-Natta (ZN) catalysts over a wide range of temperatures, e.g., 0 to 140° C., preferably 30 to 90° C.. The polymerization can be done in bulk or in inert solvents. Suitable examples of inert solvents include, but are not limited to, the aliphatic, aromatic, and cycloaliphatic hydrocarbon solvents, i.e., hexane, heptane, benzene, toluene, cyclopentane, and cyclohexane. The amount of catalyst used is preferably in the range of 0.1 g to 5 g per Kg of monomer, more preferably 0.2 to 5 g per Kg of monomer, and most preferably 0.5 to 2 g per Kg of monomer. ZN catalysts are well known in the art and are disclosed, for example, in Odian, G., supra, and Boor, J., supra.

NMR analysis of the polymers shows the presence of ethylenic unsaturation only in the pendant side-chains when the polyene monomer are non-conjugated alpha,omega-dienes. For conjugated diene monomers, e.g., isoprene or 1,3-butadiene, or for certain triene monomers, e.g., myrcene, the unsaturation appears in both.the backbone and the pendant side-chains. This occurs because the polymerization proceeds by both a 1,2 and a 1,4 polymerization mechanism (ref. Odian [supra]pp. 297–298). The 1,2 polymerization yields unsaturation in the pendant side-chains and the 1,4 polymerization yields unsaturation in the polymer backbone.

Radiation curable terpolymers have been made by polymerizing mixtures of two different $C_6$ to $C_{10}$ $\alpha$-olefins and a single polyene. Tetrapolymers have been made by polymerizing mixtures of two different $C_6$ to $C_{10}$ $\alpha$-olefins, a diene with double bonds of equal reactivity, and a diene with double bonds of unequal reactivity. The branched structure and unhindered ethylenic unsaturation in such tetrapolymers facilitates the coating and radiation curing processes used to form crosslinked PSA films from the compositions of this invention. Blends of two or more of these polymers in any proportion, e.g., ratios in the range of 0.1:9.9 to 9.9:0.1, preferably 1:9 to 9:1, can also be used to formulate compositions that yield PSA films with the peel and shear adhesion properties required for various specialized end-use applications.

Such PSA films which are free of sulfur can be prepared by activating such an adhesive composition, which contains a photocrosslinking agent, by actinic radiation. Suitable photocrosslinking agents include, but are not limited to: aldehydes, such as benzaldehyde, acetaldehyde, and their substituted derivatives; ketones such as acetophenone, benzophenone and their substituted derivatives such as Sandoray 1000 TM (Sandoz Chemicals, Inc., Charlotte, NC); quinones such as the benzoquinones, anthraquinone and their substituted derivatives; thioxanthones such as 2-isopropylthioxanthone and 2-dodecylthioxanthone; and certain chromophore-substituted vinyl halomethyl-sym-triazines such as 2,4-bis-(trichloromethyl)-6-(3',4'-dimethoxyphenyl)-sym-triazine. The concentration of photoactive crosslinking agent can be present in the range of 0.05 to 6.0, preferably 0.1 to 2 percent by weight of the polymer, and more preferably 0.5 to 1.5 percent by weight.

The adhesive composition of the present invention can be coated from solution by any of coating processes well known in the art, such as knife coating, roll coating, gravure coating, curtain coating, etc. Useful coating thicknesses for the present invention are in the range of 0.5 to 15 mg/cm$^2$, preferably in the range of 2.0 to 7.0 mg/cm$^2$. Furthermore, some of the compositions of the invention can be applied by extrusion coating with no solvent present thereby eliminating environmental and toxicity problems associated with solution coating processes.

The adhesive composition can be cured using a source of actinic radiation of sufficient energy (i.e., wavelength range) to generate free radicals when incident upon the particular photoactive crosslinking agent selected for use in the composition. The preferable wavelength range for the photoactive crosslinking agents disclosed above is 400 to 250 nm. The radiant energy in this preferred range of wavelengths required to crosslink the adhesive film of the invention is 100 to 1500 millijoules/cm$^2$ and more preferably 200 to 800 millijoules/cm$^2$. Details of the photocure process are disclosed in U.S. Pat. No. Nos. 4,181,752 and 4,329,384. Since the adhesive composition of the present invention contains a polymer, the pre-polymerization (making of a syrup) step disclosed in the '752 and '384 patents is not required and is omitted in photocuring the composition of the present invention.

The adhesive composition, without any crosslinking agent present, can also be cured using electron beam (E-beam) radiation. The preferred dosage required to crosslink the adhesive film of the invention is from 1 to 20 megarads (Mrads), preferably from 2 to 10 Mrads. Details of suitable process for E-beam curing substrates that have been coated with adhesive composition of the invention can be found in U.S. Pat. No. No. 4,533,566, which is hereby incorporated for reference.

The crosslinked adhesive films preferably have a percent gel in the range of from 2 to 95 weight percent, more preferably from 30 to 80 weight percent, and most preferably from 50 to 70 weight percent when the percent gel has been corrected for soluble tackifying resins and other additives as hereinafter described.

The addition of one or more tackifying resins to the inventive composition can provide a PSA having improved tack, lower viscosity, improved coatability, good heat stability, and improved peel adhesion. The shear adhesion of the tackified compositions can be enhanced by radiation cure with no loss of peel adhesion. The high internal strength of the adhesive is necessary in box sealing tapes and masking applications in the automotive industry.

Compatible tackifying resins useful in the radiation curable adhesive compositions of the invention include resins derived by polymerization from $C_5$ to $C_9$ unsaturated hydrocarbon monomers, polyterpenes, synthetic polyterpenes, and the like. Hydrocarbon tackifying resins can be prepared by polymerization of monomers consisting primarily of olefins and diolefins and include, for example, residual by-product monomers of the isoprene manufacturing process. These hydrocarbon tackifying resins typically exhibit Ball and Ring Softening Points of from about 80° C. to about 145° C.; Acid Numbers of from about 0 to 2, and Saponification values of less than one.

Examples of such commercially available resins based on a $C_5$ olefin fraction of this type are Wingtack TM 95 and Wingtack TM 115 (Wingtack Plus) tackifying resins available from Goodyear Tire and Rubber Co. Other hydrocarbon resins include Regalreza TM 1078 and Regalrez TM 1126 available from Hercules Chemical Co. Inc., Wilmington, DE; Arkon resins, such as Arkon TM P115, available from Arakawa Forest Chemical Industries, Chicago, IL; and Escorez TM resins available from Exxon Chemical Co.

Other suitable resins include the terpene polymers, such as polymeric resinous materials obtained by polymerization and/or copolymerization of terpene hydrocarbons such as the alicyclic, mono, and bicyclic monoterpenes and their mixtures, including carene, isomerized pinene, terpinene, terpentene, and various other terpenes. Commercially available resins of the terpene type include the Zonarez TM terpene B-series and 7000 series available from the Arizona Chemical Corp., Wayne, NJ 07470. Typical properties reported for the Zonarez TM terpene resins include Ball and Ring Softening of less than one (ASTM D465-59), and Saponification Numbers of less than one (ASTM D464-59). The terpene resin used in examples below is a poly(beta-pinene) resin, Piccolyte TM A115 available from Hercules Chemical Co. Inc., which has a Ball and Ring Softening Point of 115° C., an Acid Number of one, and Iodine Number of 190.

The tackifying resins may contain ethylenic unsaturation; however, saturated tackifying resins are preferred for those applications where oxidation resistance is important. The total amount of tackifying resins in the composition is more than 0 to 150 parts, more preferably 5 to 50 parts, and most preferably 25 to 35 parts by weight per 100 parts of polymer. For poly($\alpha$-olefin) homopolymers, the saturated tackifying resins such as Regalrez TM 1078 and Arkon TM P115 are preferred because they yield a higher gel content upon equivalent treatment by an activated crosslinking agent.

Minor amounts of additives can also be included in the composition to provide adhesives for special end uses. Such additives may include pigments, dyes, plasticizers, fillers, stabilizers, ultraviolet absorbers, anti-oxidants, processing oils, and the like. Amount of additives used can vary from 0.1 to 50 weight percent depending on the end use desired.

The adhesive composition of the present invention can be coated onto a wide range of substrate materials, examples being polymer films such as polyethylene terephthalate (PET), and biaxially oriented polypropylene (BOPP); woven and non-woven fabrics; metals and metal foils such as aluminum, copper, lead, gold and the like; paper; glass; ceramics; and composite materials comprised of laminates of one or more of these materials.

Another embodiment of the invention comprises a laminated structure of at least a first and a second substrate, the substrates being joined by a layer of the adhesive composition of the invention. At least one of the substrates is capable of transmitting actinic or electron beam radiation so that the adhesive film may be cured.

In some applications primers may be useful for improving the adhesion of the adhesive to some substrates. Useful primers for the practice of the present invention include a triblock copolymer of styrene-ethylene/ butylene-styrene grafted with maleic anhydride (Kraton TM G-1901X, Shell Chemical Co.) and a combination of amorphous polypropylene and Kraton TM G-1901X Release liners (such as described in U.S. Pat. No. Nos. 4,386,135, 3,957,724, and U.S. Pat. No. 2,532,011) form a special class of substrates on which the composition of the invention can be coated and subsequently radiation cured to form adhesive transfer films.

TEST METHODS:

The test procedures used in the examples to evaluate and compare the properties of the PSA compositions and tapes made from them are industry standard tests. These tests are described in detail in various publications of the American Society for Testing Materials (ASTM), Philadelphia, PA and the Pressure Sensitive Tape Council (PSTC), Glenview IL. References to these standards are also given.

Shear Strength (ASTM D-3654-78; PSTC - 7)

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in units of time (minutes) required to pull a standard area of PSA coated sheet material from a stainless steel test panel under stress of a constant, standard load.

The tests were conducted on adhesive coated strips applied to a stainless steel panel such that a 12.7 mm by 12.7 mm portion of each strip was in firm contact with the panel with one end portion of the tape being free. The panel with coated strip attached was held in a rack such that the coated surface of the panel forms an angle of 182° with the vertical tape free end which is then tensioned by application of a force of one kilogram applied as a hanging weight from the free end of the coated strip. The 2° greater than 180° is used to negate peel forces thus insuring that only the shear forces are measured in order to more accurately determine the holding power of the tape being tested. The time elapsed for each test specimen to separate from the steel panel is recorded as the shear strength.

Mode of Failure (MOF)

The time at which the mass falls is called "Shear Test" and is reported as "5000+" if the tape has not failed after 5000 minutes. With each Shear is indicated the mode of failure as follows:
- PP=pop-off, i.e., 75-100% adhesive failure from steelplate;
- Sp=adhesive split: both surfaces completely covered by adhesive;
- r=residue failure: adhesive covering 100% of backing with a small residue transferred to panel;
- SM=smear: adhesive covering 100% of backing with a substantial amount (less than 100%) transferred to panel;
- FB=failure from backing: 75-100% adhesive failure from the backing; all adhesive adheres to panel.

The pop-off failure mode is preferred because it is indicative of adhesive failure of the adhesive/steel interfacial bond as opposed to cohesive failure of the adhesive. Adhesives of various shear adhesions, all within the range of the present invention (1-10,000 minutes), are preferred depending on end-use applications.

Two specimens of each tape were tested and the shear tests were averaged to obtain the shear value.

Peel Adhesion [ASTM D 3330-78; PSTC - 1 (11/75)]

The peel adhesion is the force required to remove a PSA coated test specimen from a test panel measured at a specific angle and rate of removal. In the examples, this force is expressed in Newtons per decimeter (N/dm) width of coated sheet. The procedure followed is:

(1) A test specimen 12.7 mm wide is applied to a horizontally positioned clean glass test plate. A 2.2 kg rubber roller is used to press a 12.7 cm length of specimen into firm contact with the glass surface.
(2) The free end of the specimen is doubled back nearly touching itself so the angle of removal is 180°. The free end is attached to the adhesion tester scale.
(3) The glass test plate is clamped in the jaws of tensile testing machine which is capable of moving the plate away from the scale at a constant rate of 2.3 meters per minute.
(4) The scale reading in Newtons is recorded as the tape is peeled from the glass surface.

Inherent Viscosity [ASTM D 2857-70 (Reapproved 1977)]

In order to understand the benefits derived from the teaching of this invention, it is necessary to relate the improvements in shear strength and processability to the molecular weight of the PSA. The inherent viscosity of 10 ml. of PSA solution is measured using a Cannon-Fenske #50 viscometer in a water bath controlled at 5° C. The solvent used is specified in the examples.

Percent Gel Test [ASTM D 3616-82]

The percent gel is used as an indication of cure level. The tapes containing tackifying resins are corrected to the actual percent gel. The corrected percent gel is 100 times the gelled mass divided by the total mass of material that is capable of forming a gelled network. Soluble materials such as tackifiers are subtracted out when determining the gel fraction.

Crosslinking by radiation improves the creep and shear resistance of pressure-sensitive adhesives. The transition from a cohesive to an adhesive failure during peeling advances to a lower peel rate and higher temperature with increasing crosslinking density.

Many important properties of crosslinked pressure-sensitive adhesives vary with the gel content. Hence, determination of the gel content provides a means for controlling the process and thereby raising the quality of the tape.

Extraction tests permit verification of the proper gel content of polyolefin PSAs and they also permit comparison between different crosslinked adhesives and their specific end uses.

Gel Content Determination

A square test specimen (3.81 cm×3.81 cm) containing approximately 0.06 g of PSA is cut from the tape and placed in a 120-mesh stainless steel basket measurin9 approximately 4×B cm. The contents are ueighed to the nearest 0.1 m9 and then immersed in a capped beaker containing sufficient toluene to cover the specimen. After extraction for 24 to 48 hours, the basket (containing the specimen) is removed, drained, and placed in an oven at 93° C. The basket and specimen are dried to a constant weight and the gel content is determined as follows:

$$\text{Extract \%} = \frac{\text{weight lost during extraction}}{\text{weight of original specimen}} \times 100$$

Gel content = 100 − percent extract

For the tackified pressure-sensitive adhesive tapes, the weight of the resin was subtracted before calculating the corrected gel content as follows:

$$\text{Percent extract (\%)} = \frac{\text{weight lost during extraction}}{\text{weight of final specimen} - \text{weight of resin}} \times 100$$

Corrected gel content = 100 − percent extract

Two specimens of each tape were tested and the results were averaged to obtain the gel content value.

EXAMPLES

A photocure process disclosed in U.S. Pat. No. 4,181,752 can be used to practice the present invention. The laboratory scale coatings in the following examples were cured in nitrogen, in an RPC Processor Model #QC1202 ANIR (available from PPG Industries, Chicago, IL) at 30 cm/sec with two standard medium pressure mercury vapor lamps operating at 80 watts per centimeter. The lamps were located approximately 9.5 cm from the adhesive surface. Multiple passes through the processor were used to increase the degree of cure with no delay between subsequent passes. The number of passes is included in the examples.

The laboratory scale coatings described in the examples were cured using an ElectroCurtain Model CB150 (available from Energy Sciences, Inc., Woburn, MA) at a web speed of 1.4 m/min and an oxygen concentration of less than 100 ppm. The radiation dosage (Mrads) used to prepare the adhesives of the examples are included among the data.

Examples 1 to 65 pertain to the coordination polymerization of monomer mixtures to make copolymers useful in the practice of the present invention.

Examples 1 to 24 were made using vanadium-/aluminum catalysts, while Examples 25 to 65 were made using titanium/aluminum catalysts.

Examples 66-145 pertain to ultraviolet radiation crosslinked PSA films that demonstrate the wide range of adhesive properties obtainable using the invention. Examples 66-99 pertain to non-tackified adhesive films.

Examples 100-145 pertain to tackified adhesives.

Examples 146-219 pertain to E-beam crosslinked PSA films that demonstrate the wide-range of adhesive properties obainable using the invention. Examples 146-181 pertain to non-tackified adhesive films. Examples 182-219 pertain to tackified adhesives.

Objects and advantages of this invention are further illustrated by the following examples, but the particular materials and amounts thereof recited in these examples, as well as other conditions, and details, should not be construed to unduly limit this invention.

EXAMPLE 1

Synthesis of 1-hexene/1,7-octadiene copolymer (weight ratio 98:2) using a vanadium catalyst.

The following reactants were charged in the order named to a dry, argon filled, circulating water jacketed glass reactor equipped with stirrer and dry ice condenser: 625 g dry heptane, 490 g of 1-hexene (Gulftene-6 TM, available from Gulf Oil) which had been passed through alumina/silica to remove impurities and then dried over molecular sieves), 10 gm 1,7 octadiene, and 4.89 g (0.03 mole) VCl: The copolymerization was initiated by the slow addition of 8.2 ml (0.015 mole) of $(C_2H_5)_3Al$ 1.9M in toluene. The copolymerization was exothermic, and the reaction mixture was cooled by circulating water through the reactor jacket to maintain the temperature at 25° C. for five hours. One liter of methanol was added to deactivate the catalyst. The methanol was decanted from the copolymer and the soft, sticky, light green colored copolymer was washed with additional methanol to remove the catalyst residues. The copolymer was stabilized with 0.25 weight percent IRGANOX TM 1010 (a hindered phenol antioxidant available from Ciba-Geigy), and vacuum stripped at 100° C. The yield of copolymer was 85 weight percent.

The tacky copolymer had a glass transition temperature, $T_g$, of −42° C. as measured by Differential Scanning Calorimetry (DSC) analysis. It contained about 1.8 mole percent unsaturation as determined by NMR analysis.

EXAMPLES 2-24

Using the procedure, catalysts, and concentrations of Example 1, the following monomers were polymerized. The results are shown in Table I.

TABLE I

| Ex. # | Monomers[a] and Molar Ratios | Polymer Yield (%) | $T_g$[b] (°C.) |
|---|---|---|---|
| 2 | 100 H | 96 | −42 |
| 3 | 99 H:1 OD | 92 | −41 |
| 4 | 98 H:2 OD | 79 | ND[c] |
| 5 | 95 H:5 OD | 58 | −40 |
| 6 | 99 H:1 VCH | 85 | −42 |
| 7 | 98 H:2 VCH | 79 | −42 |
| 8 | 95 H:5 VCH | 67 | −44 |
| 9 | 90 H:10 VCH | 61 | ND |
| 10 | 99 H:1 ENB | 65 | ND |
| 11 | 98 H:2 ENB | 58 | ND |
| 12 | 95 H:5 ENB | 56 | ND |
| 13 | 90 H:10 ENB | 45 | ND |
| 14 | 100 O | 98 | −61 |
| 15 | 99 O:1 VCH | 87 | ND |
| 16 | 98 O:2 VCH | 89 | ND |
| 17 | 97 O:3 VCH | 76 | ND |
| 18 | 96 O:4 VCH | 82 | ND |
| 19 | 95 O:5 VCH | 75 | ND |
| 20 | 90 O:10 VCH | 62 | ND |
| 21 | 98 O:2 ENB | 68 | ND |
| 22 | 95 O:5 ENB | 59 | ND |
| 23 | 90 O:10 ENB | 57 | ND |
| 24 | 50 O:45 H:5 OD | 85 | −52 |

[a]H = 1-hexene
O = 1-octene
OD = 1.7-octadiene
VCH = 4-vinylcyclohex-1-ene
ENB = 5-ethylidene-2-norbornene
[c]ND = not determined
[b]$T_g$ = glass transition temperature

EXAMPLE 25

Synthesis of 1-pctene/VCH copolymers using a titanium catalyst

The following reactants were charged to reactor of Example 1 in the order named: 200 g of heptane, 200 g of 1-octene (dried over molecular sieves), 4 g of VCH, and 0.06 g of supported aluminum-activated reduced TiCl₃ (AATiCl₃ TM) catalyst (available from Stauffer Chemical Co., Inc.). The copolymerization was initiated by the slow addition of 0.28 ml of 1.9 M $(C_2H_5)_3Al$ which provided a molar ratio $(C_2H_5)_3Al/AATiCl_3$ of 2.5/1.0. The reaction mixture was maintained at 25° C. for 7.5 hours. The resulting copolymer was isolated by precipitation in excess methanol (85 weight percent conversion). It had a $T_g$ of −59° C. and an inherent viscosity of 4.5 dl/g in hexane solution.

EXAMPLE 26

The procedure of Example 25 was used to copolymerize 1-octene/1,7-octadiene in a weight ratio of 95/5. In this example, the polymerization was performed in dry toluene at 50 weight percent monomer. The yield was 65 percent after 18 hours of polymerization. The polymer had a $T_g$ of −58° C., and an inherent viscosity of 4.7 dl/g in hexane solution.

When the polymerization temperature was raised to 90°0 C. the polymerization yield was 72 percent by weight after 10 hours of polymerization. This polymer had a $T_g$ of $-58°$ C. and an inherent viscosity of 2.2 dl/g in hexane solution.

EXAMPLE 27

The procedure of Example 26 was used to copolymerize 1-octene/1,7-octadiene in a weight ratio 90/10./ The yield was 81 percent. The polymer had a $T_g$ of $-57°$ C., an inherent viscosity of 5.5 dl/g in hexane solution and gel content of 12% weight.

EXAMPLE 28

The polymerization of Example 26 was repeated at a temperature of 90° C. for 5 hours. The copolymer was precipitated in methanol (79 weight percent conversion) and stabilized against oxidation by the addition of 0.25% by weight IRGANOX 1010. This copolymer had a $T_g$ of $-59°$ C. and an inherent viscosity of 1.9 dl/g in hexane solution.

EXAMPLES 29-65

Using the procedure, catalysts, and concentrations specified in Example 26 a number of polymerizations were performed with the weight rtios of 1-Hexane (H) or 1-Octene (O) and the polyene co-monomers indicated in Table II.

TABLE II

| Ex. # | Monomers[a] and Wt. Ratios | Polymer Yield (%) | IV[d] (dl/g) | $T_g$ (°C.) |
|---|---|---|---|---|
| 29 | 99 H:1 OD | 85 | 5.5 | $-41$ |
| 30 | 95 H:5 OD | 72 | 4.7 | $-40$ |
| 31 | 90 H:10 OD | 56 | 3.9 | $-36$ |
| 32 | 99 H:1 VCH | 87 | 5.2 | $-42$ |
| 33 | 98 H:2 VCH | 65 | 4.6 | $-42$ |
| 34 | 95 H:5 VCH | 61 | 3.7 | $-44$ |
| 35 | 90 H:10 VCH | 65 | 3.8 | $-41$ |
| 36 | 98 H:2 ENB | 69 | 4.5 | $-42$ |
| 37 | 95 H:5 ENB | 45 | 3.9 | $-42$ |
| 38 | 90 H:10 ENB | 37 | 3.2 | ND[c] |
| 39 | 99 O:1 VCH | 72 | 4.7 | ND |
| 40 | 98 O:2 VCH | 71 | 4.8 | $-62$ |
| 41 | 97 O:3 VCH | 67 | 4.9 | $-64$ |
| 42 | 96 O:4 VCH | 72 | ND | $-64$ |
| 43 | 95 O:5 VCH | 63 | ND | $-68$ |
| 44 | 90 O:10 VCH | 57 | 3.6 | $-71$ |
| 45 | 98 O:2 ENB | 62 | ND | $-63$ |
| 46 | 95 O:5 ENB | 56 | ND | $-65$ |
| 47 | 90 O:10 ENB | 45 | ND | $-62$ |
| 48 | 97 O:3 myrcene | 52 | ND | $-62$ |
| 49 | 90 O:10 myrcene | 47 | ND | $-66$ |
| 50 | 90 O:10 beta-pinene | 56 | ND | $-66$ |
| 51 | 85 O:15 beta-pinene | 43 | ND | $-71$ |
| 52 | 90 O:10 limonene | 37 | ND | $-65$ |
| 53 | 90 O:10 styrene | 62 | 5.7 | $-68$ |
| 54 | 90 O:10 isoprene | 57 | ND | $-69$ |
| 55 | 99 O:1 benzophenone acrylate | 22 | ND | $-63$ |
| 56 | 100 1-heptene | 56 | 2.0 | ND[c] |
| 57 | 95 1-heptene:5 VCH | 32 | 3.2 | ND |
| 58 | 100 1-nonene | 46 | 4.1 | ND |
| 59 | 95 1-nonene:5 VCH | 37 | 2.7 | ND |
| 60 | 100 1-decene | 95 | 6.2 | $-64$ |
| 61 | 90 1-decene:10 BP | 60 | ND | $-71$ |
| 62 | 50 O:45 H:5 OD | 75 | ND | $-50$ |
| 63 | 50 O:47 H:3 OD | 78 | ND | $-52$ |
| 64 | 50 O:48 H:2 OD | 82 | ND | $-53$ |
| 65 | 50 O:49 H:1 OD | 91 | ND | $-53$ |

[a] H = 1-hexene
O = 1-octene
OD = 1,7-octadiene
VCH = 4-vinylcyclohex-1-ene
ENB = 5-ethylidene-2-norbornene
BP = beta-pinene
[d] IV = inherent viscosity at 0.2 gm/dl concentration
[c] ND = not determined

EXAMPLES 66-69

UV Cured Non-tackified Adhesive Tapes

Adhesive solutions of the indicated copolymers in toluene solvent (polymers were prepared according to the general procedure of Example 25) were knife coated on a 25 micrometer (μm) PET backing (3M) using a handspread coater (dry coating weights were 3.8 mg/sq. cm). The handspreads were dried at 80° C. for 5 min to remove toluene. The headspreads were cured in nitrogen in an RPC TM processor Model #QC1202 ANIR (from PPG Industries) at 30 cm/sec (60 ft./min) with two standard medium centimeter. The lamps were located at a distance of about 9.5 cm from the backing. Different types of photo-initiators were used. The results for these photocured tapes are shown in Table III.

TABLE III

| Ex. # | Monomers[a] (wt. ratio) | Photoinitiator[e] (Conc.) (Wt. %) | No. Passes | Peel Adh. (N/dm) | Shear (Min.) | MOF[f] | Gel (%) |
|---|---|---|---|---|---|---|---|
| 66 | 100 hexene-1 | 0 | 0 | 29 | 1 | SP | 0 |
| 67 | 100 hexene-1 | ITX (1.0) | 2 | 24 | 30 | r | 74 |
| 68 | 98H-2OD | 0 | 0 | 49 | 5 | SP | 3 |
| 69 | 98H-2OD | ITX (1.0) | 4 | 45 | 49 | PP | 81 |
| 70 | 95H-5OD | 0 | 0 | 31 | 3 | SP | 12 |
| 71 | 95H-5OD | ITX (0.5) | 4 | 27 | 49 | PP | 89 |
| 72 | 98H-2VCH | 0 | 0 | 30 | 10 | SP | 2 |
| 73 | 98H-2VCH | ITX (1.0) | 2 | 27 | 35 | PP | 75 |
| 74 | 95H-5VCH | 0 | 0 | 26 | 13 | SP | 0 |
| 75 | 95H-5VCH | ITX (1.0) | 2 | 22 | 5000+ | | 88 |
| 76 | 95H-5ENB | 0 | 0 | 28 | 20 | SP | 0 |
| 77 | 95H-5ENB | ITX (1.0) | 2 | 24 | 165 | PP | 85 |
| 78 | 100 heptene-1 | 0 | 0 | 63 | 1 | SP | 0 |
| 79 | 100 heptene-1 | Sandoray 1000 (1.0) | 2 | 48 | 3 | SM | 34 |
| 80 | 100 heptene-1 | XL353 (0.15) | 2 | 43 | 39 | PP | 73 |
| 81 | 95 heptene-1,5OD | 0 | 0 | 38 | 2 | SP | 5 |
| 82 | 95 heptene-1,5OD | Sandoray 1000 (1.0) | 2 | 32 | 30 | PP | 86 |
| 83 | 100 octene-1 | 0 | 0 | 33 | 1 | SP | 0 |
| 84 | 100 octene-1 | ITX (1.0) | 2 | 24 | 1 | r | 74 |
| 85 | 100 octene-1 | Sandoray 1000 (1.0) | 2 | 21 | 7 | r | 90 |
| 86 | 100 octene-1 | XL353 (0.15) | 2 | 28 | 3 | r | 85 |
| 87 | 98 O-2OD | 0 | 0 | 16 | 1 | SP | 0 |

TABLE III-continued

| Ex. # | Monomers[a] (wt. ratio) | Photoinitiator[e] (Conc.) (Wt. %) | No. Passes | Peel Adh. (N/dm) | Shear (Min.) | MOF[f] | Gel (%) |
|---|---|---|---|---|---|---|---|
| 88 | 98 O-2OD | ITX (0.5) | 4 | 13 | 1 | PP | 89 |
| 89 | 95 O-5OD | 0 | 0 | 16 | 5 | SP | 9 |
| 90 | 95 O-5OD | ITX (1.0) | 4 | 11 | 13 | PP | 92 |
| 91 | 98 O-2VCH | 0 | 0 | 24 | 2 | SP | 0 |
| 92 | 98 O-2VCH | ITX (1.0) | 4 | 21 | 37 | PP | 82 |
| 93 | 95 O-5VCH | 0 | 0 | 20 | 9 | SP | 0 |
| 94 | 95 O-5VCH | ITX (1.0) | 4 | 15 | 12 | PP | 78 |
| 95 | 95 O-5VCH | Sandoray 1000 (1.0) | 4 | 15 | 24 | PP | 86 |
| 96 | 100 nonene-1 | 0 | 0 | 21 | 1 | SM | 17 |
| 97 | 100 nonene-1 | Sandoray 1000 (1.0) | 2 | 11 | 2 | PP | 79 |
| 98 | 100 nonene-1 | Sandoray 1000 (6.0) | 2 | 4 | 1 | r | 74 |
| 99 | 100 nonene-1 | XL353 (0.15) | 2 | 23 | 3 | PP | 89 |

[f]MOF: mode of failure
SM: smear
SP: split
PP: pop off
r: residue
[a]OD: 1,7-octadiene
VCH: 4-vinylcyclohex-1-ene
ENB: ethylidene norbornene
O: 1-octene
[e]XL 353: 2,4-bis(trichloromethyl)-6-(3',4'-dimethoxyphenyl)-sym-triazine
ITX: 2-isopropylthioxanthone

EXAMPLES 100-145

UV Cured Polyolefin Adhesive Tapes Using Various Photoinitiators and Tackifying Resins Adhesive solutions of the indicated copolymers, photoinitiators, and tackifying resins in toluene solvent were knife coated on 25 micrometer (μm) PET backing (3M) using a handspread coater (dry coating weights were 3.8 mg/sq cm). The handspreads were dried at 80° C. for 5 minutes to remove the toluene. The handspreads were cured in nitrogen in an RPC processor Model #QC1202 ANIR (from PPG Industries) at 30 cm/sec (60 ft/min) with two standard medium pressure mercury lamps operating at 80 watts per centimeter. The lamps were located at a distance of about 9.5 cm from the backing. The results for these UV-photocured tapes are shown in Table IV below.

Examples 146-181

E-beam Cured Non-tackified Adhesive Tapes

Adhesive solutions of the indicated copolymers in toluene solvent were knife coated on 25 micrometer PET backing (3M) using a handspread coater (dry coating weights were 3.8 mg/sq cm). The handspreads were dried at 80° C. for 5 min to remove the toluene. The resulting tapes were E-beam cured using an ElectroCurtain model CB150 (available from Energy Sciences, Inc.) at a web speed of 1.4 m/min and an oxygen concentration of less than 100 ppm. Various dosages of radiation were used to cure the PSAs. The results are shown in Table V below.

Examples 182-219

E-beam Cured Tackified Adhesive Tapes

The indicated copolymers and tackifying resins were dissolved in toluene (15 % solids) to form adhesive coating solutions. The coating, E-beam curing, and test procedures of Example 146-181 were used to make and test the tapes of these examples. The results are shown in Table VI below.

TABLE IV

| Ex. # | Monomers[a] (wt. ratio) | Resin[g] | Polymer to Resin ratio | Photoinitiator[e] (conc. wt %) | No. of Passes | Peel (N/dm) | Shear (min) | Mode of Failure[f] | Gel (%) |
|---|---|---|---|---|---|---|---|---|---|
| 100 | hexene-1 | 1 | 75:25 | 0.5 (ITX) | 4 | 85 | 35 | SP | 33 |
| 101 | 98 H-2OD | 1 | 75:25 | 0.5 (ITX) | 4 | 90 | 890 | r | 31 |
| 102 | 98 H-2OD | 1 | 75:25 | 1.0 (ITX) | 4 | 92 | 317 | r | 36 |
| 103 | 98H-2VCH | 1 | 90:10 | 0.25 (ITX) | 4 | 56 | 18 | r | 17 |
| 104 | 95H-5VCH | 1 | 75:25 | 1.0 (ITX) | 2 | 61 | 1826 | r | 46 |
| 105 | 95H-5ENB | 1 | 75:25 | 1.0 (ITX) | 4 | 61 | 2500 | r | 52 |
| 106 | 95H-5OD | 1 | 75:25 | 1.0 (S) | 4 | 63 | 3900 | r | 48 |
| 107 | 95H-5OD | 1 | 75:25 | 1.0 (BP) | 4 | 68 | 3200 | r | 41 |
| 108 | 95H-5OD | 2 | 75:25 | 1.0 (S) | 4 | 79 | 48 | PP | 72 |
| 109 | 85H-15OD | 3 | 75:25 | 1.0 (BP) | 4 | 53 | 9000+ |  | 76 |
| 110 | 95H-5VCH | 2 | 75:25 | 1.0 (S) | 4 | 73 | 8500 | r | 63 |
| 111 | 95H-5VCH | 3 | 75:25 | 1.0 (S) | 4 | 53 | 3235 | r | 69 |
| 112 | heptene-1 | 2 | 95:5 | 1.0 (S) | 2 | 35 | 5 | SP | 60 |
| 113 | heptene-1 | 2 | 50:50 | 1.0 (S) | 2 | — | 666 | SP | 50 |
| 114 | heptene-1 | 2 | 95:5 | 1.0 (XL353) | 2 | 45 | 26 | PP | 77 |
| 115 | 95 heptene-1-5OD | 2 | 75:25 | 1.0 (S) | 2 | 74 | 1050 | r | 56 |
| 116 | 95 heptene-1-5OD | 3 | 75:25 | 1.0 (S) | 2 | 57 | 940 | r | 58 |
| 117 | 95 heptene-1-5OD | 3 | 75:25 | 1.0 (BP) | 2 | 56 | 625 | r | 52 |
| 118 | octene-1 | 1 | 75:25 | 1.0 (ITX) | 4 | 83 | 7 | SP | 46 |
| 119 | 99O-1OD | 1 | 75:25 | 1.0 (ITX) | 4 | 50 | 400 | r | 63 |
| 120 | 98O-2OD | 1 | 75:25 | 1.0 (ITX) | 4 | 53 | 8000+ |  | 57 |
| 121 | 98O-2VCH | 1 | 75:25 | 1.0 (ITX) | 4 | 79 | 8 | PP | 30 |
| 122 | 98O-2VCH | 1 | 75:25 | 1.0 (S) | 4 | 68 | 45 | PP | 51 |

TABLE IV-continued

| Ex. # | Monomers[a] (wt. ratio) | Resin[g] | Polymer to Resin ratio | Photoinitiator[e] (conc. wt %) | No. of Passes | Peel (N/dm) | Shear (min) | Mode of Failure[f] | Gel (%) |
|---|---|---|---|---|---|---|---|---|---|
| 123 | 95O-5VCH | 1 | 85:15 | 1.0 (ITX) | 6 | 58 | 29 | PP | 80 |
| 124 | octene-1 | 2 | 75:25 | B (1.0) | 4 | 78 | 51 | SP | 62 |
| 125 | octene-1 | 2 | 75:25 | ITX (1.0) | 4 | 88 | 75 | SM | 52 |
| 126 | octene-1 | 2 | 75:25 | (S) | 4 | 80 | 37 | SM | 55 |
| 127 | octene-1 | 4 | 75:25 | BP (1.0) | 4 | 74 | 8 | SP | 9 |
| 128 | octene-1 | 4 | 75:25 | ITX (1.0) | 4 | 78 | 7 | SP | 6 |
| 129 | octene-1 | 4 | 75:25 | (S) | 4 | 74 | 32 | SP | 32 |
| 130 | octene-1 | 3 | 75:25 | BP (1.0) | 4 | 79 | 94 | SM | 57 |
| 131 | octene-1 | 3 | 75:25 | ITX (1.0) | 4 | 76 | 32 | SP | 27 |
| 132 | octene-1 | 3 | 75:25 | S (1.0) | 4 | 78 | 110 | SM | 44 |
| 133 | octene-1 | 2 | 75:25 | 0 | 0 | 85 | 4 | SP | 2 |
| 134 | octene-1 | 4 | 75:25 | 0 | 0 | 60 | 5 | SP | 5 |
| 135 | octene-1 | 1 | 75:25 | 0 | 0 | 76 | 2 | SP | 0 |
| 136 | octene-1 | 3 | 75:25 | 0 | 0 | 84 | 4 | SP | 0 |
| 137 | 98O-2OD | 2 | 75:25 | BP (1.0) | 4 | 71 | 481 | SM | 62 |
| 138 | 98O-2OD | 4 | 75:25 | BP (1.0) | 4 | 58 | 35 | SP | 25 |
| 139 | 98O-2OD | 1 | 75:25 | BP (1.0) | 4 | 72 | 23 | SP | 15 |
| 140 | 98O-2OD | 3 | 75:25 | BP (1.0) | 4 | 79 | 545 | r | 68 |
| 141 | nonene-1 | 2 | 95:5 | 0 | 0 | 31 | 2 | SP | 0 |
| 142 | nonene-1 | 2 | 50:50 | 0 | 0 | AT[h] | 10000+ |  | 0 |
| 143 | nonene-1 | 2 | 95:5 | S (1.0) | 2 | 19 | 2 | r | 88 |
| 144 | nonene-1 | 2 | 50:50 | S (1.0) | 2 | AT | 10000+ |  | 85 |
| 145 | nonene-1 | 2 | 95:5 | XL | 2 | 31 | 5 | PP | 89 |

[f]SP: split; SM: smear; r: residue; PP: pop off; [a]O: 1-octene; H: 1-Hexene; OD: 1,7-octadiene; VCH: vinylcyclohexene; [e]BP: benzophenone; ITX: 2-isopropylthioxanthone; S: Sandoray 1000; XL = XL353 photocrosslinking agent
[h]AT = adhesive transfer
[g]Resin:
1 = Wingtack Plus
2 = Regalrez 1126
3 = Arkon P115
4 = Piccolyte A115

TABLE V

| Ex. # | Monomers[a] (wt. ratio) | Dose (Mrad) | Peel (N/dm) | Shear (Min) | Mode of Failure[f] | Gel (%) |
|---|---|---|---|---|---|---|
| 146 | 100 hexene-1 | 0 | 33 | 1 | SP |  |
| 147 | 100 hexene-1 | 2 | 33 | 88 | SP | 13 |
| 148 | 100 hexene-1 | 4 | 31 | 122 | SP | 29 |
| 149 | 100 hexene-1 | 6 | 33 | 117 | SP | 33 |
| 150 | 100 hexene-1 | 10 | 35 | 173 | SP | 50 |
| 151 | 100 hexene-1 | 15 | 35 | 124 | SP | 55 |
| 152 | 99H-1OD | 2 | 37 | 139 | SP | 52 |
| 153 | 99H-1OD | 4 | 33 | 133 | SM | 62 |
| 154 | 99H-1OD | 6 | 33 | 53 | PP | 63 |
| 155 | 99H-1OD | 10 | 31 | 16 | PP | 74 |
| 156 | 99H-1OD | 15 | 30 | 29 | PP | 77 |
| 157 | 98H-2OD | 2 | 18 | 3 | SM | 69 |
| 158 | 98H-2OD | 4 | 15 | 3 | SM | 79 |
| 159 | 98H-2OD | 6 | 10 | 1 | PP | 81 |
| 160 | 98H-2OD | 10 | 11 | 1 | PP | 89 |
| 161 | 98H-2OD | 15 | 8 | 1 | PP | 91 |
| 162 | 95H-5OD | 2 | 22 | 6 | PP | 83 |
| 163 | 95H-5OD | 4 | 15 | 89 | PP | 87 |
| 164 | 95H-5OD | 6 | 13 | 16 | PP | 86 |
| 165 | 95H-5OD | 10 | 10 | 35 | PP | 98 |
| 166 | 100 octene-1 | 0 | 31 | 1 | SP | 0 |
| 167 | 100 octene-1 | 2 | 28 | 10 | SP | 34 |
| 168 | 100 octene-1 | 4 | 28 | 11 | SP | 44 |
| 169 | 100 octene-1 | 6 | 26 | 10 | SP | 51 |
| 170 | 100 octene-1 | 10 | 30 | 15 | SP | 67 |
| 171 | 100 octene-1 | 15 | 23 | 5 | SP | 76 |
| 172 | 98O-2OD | 2 | 18 | 3 | SM | 69 |
| 173 | 98O-2OD | 4 | 15 | 2 | SM | 79 |
| 174 | 98O-2OD | 6 | 10 | 950 | r | 80 |
| 175 | 98O-2OD | 10 | 11 | 685 | r | 89 |
| 176 | 98O-2OD | 15 | 8 | 2 | PP | 91 |
| 177 | 50 O-45H-5OD | 2 | 21 | 12 | PP | 80 |
| 178 | 50 O-45H-5OD | 4 | 18 | 2 | PP | 86 |
| 179 | 50 O-45H-5OD | 6 | 13 | 4 | PP | 86 |
| 180 | 50 O-45H-5OD | 10 | 11 | 3 | PP | 94 |
| 181 | 50 O-45H-5OD | 15 | 7 | 3 | PP | 95 |

[f]SM: smear; SP: split; r: residue; PP: popoff.
[a]H: hexene; O: octene; OD: 1,7-octadiene

TABLE VI

| Ex. # | Monomers[a] (wt. ratio) | resin[g] | Polymer to resin ratio (wt. %) | Dose (Mrad) | Peel (N/dm) | Shear (min) | Mode of failure[f] | Gel (%) |
|---|---|---|---|---|---|---|---|---|
| 182 | octene-1 | 1 | 75:25 | 2 | 62 | 3 | SP | 5 |
| 183 | octene-1 | 1 | 75:25 | 4 | 63 | 3 | SP | 8 |
| 184 | octene-1 | 1 | 75:25 | 6 | 59 | 4 | SP | 19 |
| 185 | octene-1 | 1 | 75:25 | 10 | 63 | 19 | SP | 57 |
| 186 | octene-1 | 1 | 75:25 | 15 | 74 | 31 | SP | 52 |
| 187 | 98O-2OD | 1 | 75:25 | 2 | 62 | 2 | SP | 8 |
| 188 | 98O-2OD | 1 | 75:25 | 4 | 69 | 12 | SP | 21 |
| 189 | 98O-2OD | 1 | 75:25 | 6 | 60 | 49 | SP | 54 |
| 190 | 98O-2OD | 1 | 75:25 | 10 | 59 | 53 | SP | 53 |
| 191 | 98O-2OD | 1 | 75:25 | 15 | 57 | 65 | PP | 63 |
| 192 | hexene-1 | 1 | 75:25 | 2 | 70 | 45 | SP | 6 |
| 193 | hexene-1 | 1 | 75:25 | 4 | 68 | 25 | SP | 9 |
| 194 | hexene-1 | 1 | 75:25 | 6 | 59 | 18 | SP | 8 |
| 195 | hexene-1 | 1 | 75:25 | 10 | 66 | 13 | SP | 14 |
| 196 | hexene-1 | 1 | 75:25 | 15 | 63 | 18 | SP | 12 |
| 197 | hexene-1 | 2 | 75:25 | 4 | 83 | 453 | SP | 62 |
| 198 | 99H-1OD | 1 | 75:25 | 2 | 62 | 18 | SP | 3 |
| 199 | 99H-1OD | 1 | 75:25 | 4 | 63 | 18 | SP | 3 |
| 200 | 99H-1OD | 1 | 75:25 | 6 | 62 | 17 | SP | 2 |
| 201 | 99H-1OD | 1 | 75:25 | 10 | 57 | 22 | SP | 17 |
| 202 | 99H-1OD | 1 | 75:25 | 15 | 63 | 31 | PP | 62 |
| 203 | 99H-2OD | 1 | 75:25 | 2 | 63 | 55 | SP | 14 |
| 204 | 99H-2OD | 1 | 75:25 | 4 | 55 | 186 | SP | 20 |
| 205 | 99H-2OD | 1 | 75:25 | 6 | 59 | 178 | SP | 35 |
| 206 | 99H-2OD | 1 | 75:25 | 10 | 50 | 479 | SP | 47 |
| 207 | 99H-2OD | 1 | 75:25 | 15 | 59 | 934 | SP | 49 |
| 208 | 99H-2OD | 2 | 75:25 | 4 | 70 | 2529 | SP | 74 |
| 209 | 95H-5OD | 1 | 75:25 | 2 | 59 | 630 | SP | 58 |
| 210 | 95H-5OD | 1 | 75:25 | 4 | 44 | 923 | SM | 64 |
| 211 | 95H-5OD | 1 | 75:25 | 6 | 46 | 424 | SM | 67 |
| 212 | 95H-5OD | 1 | 75:25 | 10 | 50 | 81 | PP | 75 |
| 213 | 95H-5OD | 1 | 75:25 | 15 | 39 | 93 | PP | 77 |
| 214 | 95H-5OD | 2 | 75:25 | 4 | 69 | 5000+ | | 73 |
| 215 | 50 O-45H-5OD | 1 | 75:25 | 2 | 55 | 133 | SP | 46 |
| 216 | 50 O-45H-5OD | 1 | 75:25 | 4 | 54 | 272 | SM | 59 |
| 217 | 50 O-45H-5OD | 1 | 75:25 | 6 | 46 | 195 | SM | 62 |
| 218 | 50 O-45H-5OD | 1 | 75:25 | 10 | 46 | 155 | SM | 75 |
| 219 | 50 O-45H-5OD | 1 | 75:25 | 15 | 46 | 47 | PP | 75 |

[f]SP: split; SM: smear; PP: pop off.
[a]O: 1-octene; H: 1-hexene; OD: 1,7 octadiene;
[g]tackifying resin type
1 = Wingtack Plus
2 = Regalrez 1126
3 = Arkon P115
4 = Piccolyte A115

Various modifications and alterations of this invention will become apparent to those skilled in the art without departing from the scope and spirit of this invention, and it should be understood that this invention is not to be unduly limited to the illustrative embodiments set forth herein.

We claim:

1. An ultraviolet rdiation curable poly($\alpha$-olefin) pressure-sensitive adhesive composition comprising:
   (a) at least one polymer comprising the reaction product of from 85 to 100 mole percent $C_6$ to $C_{10}$ $\alpha$-olefins and 15 to 0 mole percent of one or more polyene monomers;
   (b) an effective amount of an ultraviolet radiation activatable crosslinking agent,
   said composition being free of sulfur.

2. The radiation curable poly($\alpha$-olefin) pressure-sensitive adhesive composition according to claim 1 wherein said polymer is selected from the group consisting of a homopolymer, a copolymer, a terpolymer, and a tetrapolymer containing at least two polyene monomers.

3. The radiation curable poly(alpha-olefin) pressure-sensitive adhesive composition of claim 1 wherein said polymer has an inherent viscosity of 0.4 to 9.0 dl/g.

4. The radiation curable pressure-sensitive adhesive composition of claim 1 wherein the polyene monomers are selected from the group consisting of aliphatic dienes, aliphatic trienes, aliphatic tetraenes, aromatic dienes, aromatic trienes, monocyclic dienes, bicyclic dienes, tricyclic dienes, tetracyclic dienes, monocyclic trienes, bicyclic trienes, tricyclic trienes, and tetracyclic trienes.

5. The radiation curable poly($\alpha$-olefin) pressure-sensitive adhesive composition according to claim 1 wherein said polymer. comprises residual ethylenically unsaturated groups in pendant side chains.

6. The radiation curable poly($\alpha$-olefin) pressure-sensitive adhesive composition according to claim 1 wherein said polymer comprises resdiual ethylenically unsaturated groups in the backbone.

7. The radiation curable poly($\alpha$-olefin) pressure-sensitive adhesive composition according to claim 1 wherein said polymer comprises residual ethylencially unsaturated groups both in the backbbone and in pendant side chains.

8. The radiation curable poly($\alpha$-olefin) pressure-sensitive adhesive composition of claim 1 wherein said polymer had an inherent viscosity in the range of 0.5 to 6.0 dl/g.

9. The radiation curable poly($\alpha$-olefin) pressure-sensitive adhesive composition of claim 1 wherein said polymer had an inherent viscosity in the range of 1.5 to 4.0 dl/g.

10. The radiation curable poly($\alpha$-olefin) pressure-sensitive adhesive composition according to claim 1 wherein said photoactive crosslinking agent is selected from the group consisting of akdehydes, ketones, quinones, thioxanthones, and s-triazines.

11. The radiation curable pressure-sensitive adhesive composition of claim 10 wherein the concentration of said photoactive-crosslinking agent is in the range of 0.05 to 6.0 percent by weight of the polymer.

12. The radiation curable poly($\alpha$-olefin) pressure-sensitive adhesive composition of claim 1 further comprising a tackifying resin in an amount in the range of more than 0 to 150 parts per hundred parts of the adhesive composition.

13. The radiation curable poly($\alpha$-olefin) pressure-sensitive adhesive according to claim 12 wherein said tackifying resin is selected from the group consisting of $C_5$ to $C_9$ hydrocarbon monomers.

14. The radiation curable pressure-sensitive adhesive composition of claim 12 wherein said tackifying resin is selected from the group consisting of hydrocarbon resins and polyterpenes resins.

15. The radiation curable poly($\alpha$-olefin) pressure-sensitive adhesive composition according to claim 1 further comprising a chemically effective amount of at least one additive selected from the group consisting of pigments, dyes, fillers, plasticizers, stabilizers, antioxidants, and processing oils.

16. The cured pressure-sensitive adhesive composition according to claim 1.

17. The cured pressure-sensitive adhesive composition according to claim 16 wherein said polymer had a gel content in the range of 2 to 95 weight percent.

18. The cured pressure-sensitive adhesive composition according to claim 16 wherein said polymer had a gel content in the range of 30 to 80 weight percent.

19. A rdiation curable poly($\alpha$-olefin) pressure-sensitive adhesive composition comprising:
(a) a crosslinkable polymer with the formula:

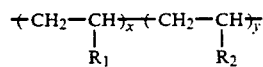

where $R_1$ is selected from monovalent hydrocarbon groups containing 4 to 8 carbon atoms;
$R_2$ is a monovalent hydrocarbon group containing one or more ethylenically unsaturated groups selected from the group consisting of:

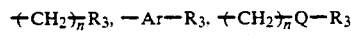

n = an integer 0 to 14;
$R_3$ is a $C_2$ to $C_{10}$ monovalent hydrocarbon group containing one or more ethylenically unsaturated groups;
Ar is a divalent aromatic radical containing 1 to 2 aromatic rings having from 0-8 substituents selected from the group consisting of alkyl, aryl, cycloalkyl, alkoxy, and aryloxy containing from 1-12 carbon atoms;

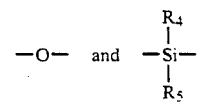

where $R_4$ to $R_5$ are the same or different $C_1$ to $C_{10}$ monovalent organic groups selected from the group consisting of alkyl, cycloalkyl, alkaryl, aryl, alkoxy, aryloxy; x is the mole percent of one or more $C_6$-$C_{10}$ $\alpha$-olefin monomer(s), the total ranging from 85-100 ole percent; y is the mole percent of one or more polyene monomers(s), the total ranging from 0-15 mole percent; with the proviso that x+y=100 mole percent.
(b) an effective amount of one or more photoactive-crosslinking agents sufficient to crosslink the pressure-sensitive adhesive composition upon irradiation from a source of actinic radiation.

20. A method comprising the steps of:
(a) providing an admixture comprising at least one polymer comprising the reaction product of from 85 to 100 mole percent $C_6$ to $C_{10}$ $\alpha$-olefins and 15 to 0 mole percent of one or more polyene monomers, and
(c) subjecting said admixture, said admixture being free of sulfur, admixture to electron beam to provide a crosslinked polymer.

21. A method comprising the steps of:
(a) polymerizing an admixture comprising at least one polymer comprising the reaction product of from 85 to 100 mole percent $C_6$ to $C_{10}$ $\alpha$-olefins and 15 to 0 mole percent of one or more polyene monomers and an effective amount of a conventional 2-component Ziegler-Natta catalyst, and then adding an effective amount of an ultraviolet radiation activatable crosslinking agent, and
(b) subjecting the admixture to ultraviolet radiation to provide a crosslinked polymer said composition being free of sulfur.

22. An electron beam cured poly($\alpha$-olefin) pressure-sensitive adhesive composition comprising at least one polymer comprising the reaction product of from 85 to 100 mole percent $C_6$ to $C_{10}$ $\alpha$-olefins and 15 to 0 mole percent of one or more polyene monomers and said composition being cured and crosslinked by electron beam radiation.

23. An ultraviolet radiation curable poly ($\alpha$-olefin) pressure-sensitive adhesive composition comprising:
(a) at least one polymer comprising the reaction product of from 85 to 99 mole percent $C_6$ to $C_{10}$ $\alpha$-olefins and 15 to 1 mole percent of one or more polyene monomers;
(b) an effective amount of an ultraviolet rdiation activatable crosslinking agent,
said composition being free of sulfur.

24. The cured pressure-sensitive adhesive composition according to claim 23.

25. A cured poly($\alpha$-olefin) pressure sensitive adhesive composition consisting essentially of the crosslinked reaction product of from 85 to 99 mole percent $C_6$ to $C_{10}$ $\alpha$-olefins and 15 to 1 mole percent of one or more polyene monomers;
said composition being free of sulfur, and
said composition being cured and crosslinked by electron beam radiation.

* * * * *

UNITED STATES PATENT AND TRADEMARK OFFICE
CERTIFICATE OF CORRECTION

PATENT NO. : 5,112,882

DATED : May 12, 1992

INVENTOR(S) : Gaddam N. Babu, Susan S. Christopher, Bruce C. Copley, Thomas S. Overstreet It is certified that error appears in the above-identified patent and that said Letters Patent is hereby corrected as shown below:

Column 20, line 48, "polymer. comprises" should read --polymer comprises--;

Column 20, line 52, "resdiual" should read --residual--;

Column 20, line 56, "ethylencially" should read --ethylenically--;

Column 20, line 57, "backbbone" should read --backbone--;

Column 21, line 2, "akdehydes" should read -aldehydes--;

Column 21, line 22, "polyterpenes" should read --polyterpene--;

Column 21, line 34, "had" should read --has--;

Column 21, line 37, "had" should read --has--;

Column 21, line 40, "rdiation" should read --radiation--;

Column 21, line 67, after "atoms;", a new paragraph should be added --Q is a divalent group selected from the group consisting of--;

Column 22, line 8, "$R_4$ to $R_5$" should read -- $R_4$ and $R_5$--;

Column 22, line 12, "ole" should read --mole--;

Column 22, lines 26-28, "(c) subjecting said admixture, said admixture being free of sulfur, admixture to electron beam to provide a crosslinked polymer." should read --(b) subjecting said admixture to electron beam to provide a crosslinked polymer, said admixture being free of sulfur.--

Column 22, line 39, "polymer" should read --polymer,--

Column 22, line 39, "composition" should read --admixture--; and

UNITED STATES PATENT AND TRADEMARK OFFICE
CERTIFICATE OF CORRECTION

PATENT NO. : 5,112,882

DATED : May 12, 1992

INVENTOR(S) : Gaddam N. Babu, Susan S. Christopher, Bruce C. Copley, Thomas S. Overstreet It is certified that error appears in the above-identified patent and that said Letters Patent is hereby corrected as shown below:

Column 22, lines 45-47, "and said composition being cured and crosslinked by electron beam radiation" should read --, said composition being free of sulfur, and said composition being cured and crosslinked by electron beam radiation.--

Signed and Sealed this

Twenty-sixth Day of September, 2000

Attest:

Q. TODD DICKINSON

Attesting Officer

Director of Patents and Trademarks